(12) United States Patent
Mihan et al.

(10) Patent No.: US 6,887,958 B1
(45) Date of Patent: May 3, 2005

(54) METHOD FOR POLYMERIZING OLEFINS

(75) Inventors: Shahram Mihan, Ludwigshafen (DE); Randolf Köhn, Bath (GB); Guido Seifert, Berlin (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 101 days.

(21) Appl. No.: 09/937,780

(22) PCT Filed: Oct. 5, 2000

(86) PCT No.: PCT/EP00/02716

§ 371 (c)(1),
(2), (4) Date: Sep. 28, 2001

(87) PCT Pub. No.: WO00/58370

PCT Pub. Date: Oct. 5, 2000

(30) Foreign Application Priority Data

May 14, 1999 (DE) .......................................... 199 22 048
Jul. 30, 1999 (DE) .......................................... 199 35 407

(51) Int. Cl.$^7$ .................................................. C08F 4/52
(52) U.S. Cl. ...................... 526/161; 526/160; 526/169; 526/169.1; 526/172; 526/170; 526/348
(58) Field of Search ................................ 526/172, 161, 526/169

(56) References Cited

U.S. PATENT DOCUMENTS 5,576,263 A * 11/1996 Badley et al. .............. 502/237

FOREIGN PATENT DOCUMENTS

JP       10-231317 A   *   9/1998   ............. C08F/4/68

OTHER PUBLICATIONS

Schumann, H. Z. Naturforsch. 1995, 50b, 1038–1044.*
Armanasco, N. L.; Baker, M. V.; North, M. R.; Skelton, B. W.; White, A. H. J. Chem. Soc., Dalton Trans. 1997. 1363–1368.*
Köhn, R.D.: Kociok–Köhn, G.; Haufe, M. J. Organomet. Chem. 1995, 501, 303–307.*
Haufe, M.; Köhn, R.D.; Weimann, R.; Seifert, G.; Zeigan, D. J. Organomet, Chem. 1996, 520, 121–129.*
Köhn, R.D.; Kociok–Köhn, G.; Haufe, M. Chem. Ber. 1996, 129, 25–27.*
Köhn, R.D.; Kociok–Köhn, G. Angew. Chem. Int. Ed. Engl. 1994, 33, 1877–1878.*
JP 10–231317 Abstract in English.*
English translation of JP 10–231317.*
Koehn, R.D.: Haufe, M.; Seifert, G.; Kociok–Koehn, G. Abstr. ACS, 213th ACS National Meeting, San Francisco, Apr. 13–17, 1997.*
Köhn, R.D.; Haufe, M.; Kociok–Köhn, G.; Filippou, A.C. Inorg. Chem. 1997, 36, 6064–6069.*
Kim. W.–K.; Fevola, M. J.; Liable–Sands. L. M.; Rheingold, A.L.; Theopold, K. H. Organometallics (1988) 17, 4541–4543.*

* cited by examiner

*Primary Examiner*—David W. Wu
*Assistant Examiner*—Rip A. Lee
(74) *Attorney, Agent, or Firm*—Keil & Weinkauf

(57) ABSTRACT

Ethylene or propylene are copolymerized with one another or with other olefinically unsaturated compounds in the presence of a catalyst system comprising the following components:
A) a complex of a transition metal with one or two substituted or unsubstituted 1,3,5-triazacyclohexane ligands or corresponding ligands in which one or more of the ring nitrogens are replaced by phosphorus or arsenic atoms, and
B) if desired, one or more activator compounds.

12 Claims, No Drawings

METHOD FOR POLYMERIZING OLEFINS

The present invention relates to a process for the copolymerization of ethylene or propylene with one another or with other olefinically unsaturated compounds.

The present invention further provides a process of this type which is carried out at from 20 to 300° C. and pressures of from 5 to 4 000 bar, provides for the use of a complex of a transition metal with one or two substituted or unsubstituted 1,3,5-triazacyclohexane ligands or corresponding ligands in which one or more ring nitrogens are replaced by phosphorus or arsenic atoms in the copolymerization of ethylene or propylene with one another or with other olefinically unsaturated compounds and also provides transition metal complexes with specifically substituted triazacyclohexane ligands.

Single site catalysts are gaining increasing importance in the polymerization of olefins. These catalyst systems lead to polymers having narrow molecular weight distributions, which results in particularly favorable mechanical properties. Among these single site catalysts, metallocene catalysts have achieved particular industrial importance. However, many metallocene catalysts can be obtained only by means of multistage syntheses and therefore represent a significant cost factor in olefin polymerization.

Triazacyclohexane and its derivatives, which differ in having different substitution patterns, have been known for a long time and are used in a variety of ways in industry since they can be prepared in a simple and inexpensive manner from simple starting materials. Thus, for example, triazacyclohexane derivatives are used in the desulfurization of kerosene. However, the use of triazacyclohexane and its derivatives as ligands in the preparation of organometallic complexes is not widespread. Only isolated reports of complexes with these ligands have appeared in the organometallic literature, for example in N. L. Armanasco, M. V. Baker, M. R. North, B. W. Skelton, A. H. White, J. Chem. Soc., Dalton Trans. (1997), 1363–1368; H. Schumann, Z. Naturforsch., part B50 (1995), 1038–1043; R. D. Köhn, et al. Angew. Chem. Int. Ed. Engl. 33 (1994), 1877–1878; J. Organomet. Chem. 501 (1995), 303–307; Chem. Ber. 129 (1996), 25–27; J. Organomet. Chem 520 (1996), 121–129; Inorg. Chem. 36 (1997), 6064–6069; Chem. Ber. 129 (1996), 1327–1333. Triazacyclohexane complexes in the polymerization of olefins has, however, been unknown until recently.

At the [lacuna] in Dallas, Tex., one of the inventors of the present patent application reported the first experiments on the polymerization of ethylene using an N,N,N-trioctyltriazacyclohexane-chromium complex and methylaluminoxane as activator. However, nothing was said about the suitability of the catalyst system for copolymerization; it was merely remarked that contact of the catalyst system with 1-hexene leads selectively to trimerization. [sic]

At the 213th ACS National Meeting, Apr. 13–Apr. 17, 1997 in San Francisco and the 215th ACS National Meeting, Mar. 29–Apr. 2, 1998 in Dallas, Tex., one of the inventors of the present patent application reported the first experiments on the polymerization of ethylene using an N,N,N-trioctyltriazacyclohexane-chromium complex and methylaluminoxane as activator. However, nothing was said about the suitability of the catalyst system for copolymerization; it was merely remarked that contact of the catalyst system with 1-hexene leads selectively to trimerization.

In JP-A-10 231317, symmetrically substituted triazacyclohexane-chromium complexes, inter alia, are used together with tris(pentafluorophenyl)borane and aluminum alkyl for preparing polymers and oligomers in solution or suspension. The polymers obtained often contain relatively large amounts of low molecular weight products and therefore have a broad molecular weight distribution. Nothing was said about the suitability of the catalyst system for copolymerization.

It is an object of the present invention to find a process for the polymerization of olefins, in particular of ethylene or propylene with one another or with other olefinically unsaturated compounds, which is based on a catalyst system which has good polymerization activity and can be prepared in a simple and inexpensive manner from simple starting materials.

We have found that this object is achieved by a process for the copolymerization of ethylene or propylene with one another or with other olefinically unsaturated compounds, wherein the polymerization is carried out in the presence of a catalyst system comprising the following components:

A) a complex of a transition metal with one or two substituted or unsubstituted 1,3,5-triazacyclohexane ligands or corresponding ligands in which one or more of the ring nitrogens are replaced by phosphorus or arsenic atoms, and B) if desired, one or more activator compounds.

We have also found the use of such a complex of a transition metal (A) in the copolymerization of ethylene or propylene with one another or with other olefinically unsaturated compounds.

The invention also provides a process for the copolymerization of ethylene or propylene with one another or with other olefinically unsaturated compounds at from 20 to 300° C. and pressures of from 5 to 4 000 bar, which comprises the following process steps:

a) bringing a complex of a transition metal with one or two substituted or unsubstituted 1,3,5-triazacyclohexane ligands (A) into contact with at least one activator compound (B)

(b) bringing the reaction product from step (a) into contact with the olefinically unsaturated compounds under polymerization conditions.

Step b) can be carried out after step a), but also simultaneously with a).

In one embodiment of the process of the present invention, the component (A) used is a compound of the formula I

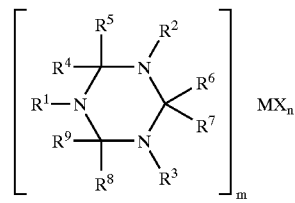

where the variables have the following meanings:

M is a transition metal of groups 4 to 12 of the Periodic Table, $R^1$–$R^9$ are hydrogen or organosilicon or organic substituents having from 1 to 30 carbon atoms, where two geminal or vicinal radicals $R^1$ to $R^9$ may also be joined to form a 5- or 6-membered ring and, when m is 2, a radical $R^1$–$R^9$ of in each case one triazacyclohexane ring together with one of the substituents from the other triazacyclohexane ring may also form a bridge between the two rings, X is fluorine, chlorine, bromine, iodine, hydrogen, $C_1$–$C_{10}$-alkyl, $C_6$–$C_{15}$-aryl or alkylaryl having from 1 to 10 carbon atoms in the alkyl part and from 6 to 20 carbon atoms in the aryl part, trifluoroacetate, $BF_4$—, PF6— or a bulky noncoordinating anion, m is 1 or 2, n is a number from 1 to 4 corresponding to the oxidation state of the transition metal M.

Suitable transition metals M are, in particular, the elements of groups 4 to 8 of the Periodic Table and especially the elements of group 6 of the Periodic Table. Particularly useful central atoms in the transition metal complexes used according to the present invention are the elements titanium, zirconium, hafnium, vanadium, chromium, molybdenum, tungsten, manganese, iron, rhodium and nickel. Particular preference is given to using transition metal complexes of chromium.

Variation of the substituents on the triazacyclohexane ring system allows various properties of the catalyst system to be influenced. Thus, the catalyst activity can generally be increased by the introduction of substituents, in particular on the nitrogen atoms of the ring system. Furthermore, the ability of the polyolefins to be polymerized to gain access to the central atom can be influenced by means of the number and type of the substituents. This also allows the activity of the catalyst, the selectivity in respect of various monomers, in particular bulky monomers, and the molecular weight of the resulting polymers to be influenced. The chemical structure of the substituents $R^1$ to $R^9$ can therefore be varied within a wide range in order to achieve the desired results and to obtain a tailored catalyst system. Possible organic substituents are, for example, $C_1$–$C_{18}$-alkyl, 5- to 7-membered cycloalkyl which may in turn bear a $C_1$–$C_{10}$-aryl group as substituent, $C_6$–$C_{15}$-aryl or arylalkyl, where, if desired, two geminal or vicinal radicals $R^1$ to $R^9$ may also be joined to form a 5- or 6-membered ring. Possible organosilicon substituents are, in particular, trialkylsilyl groups having from 1 to 10 carbon atoms in the alkyl radical, in particular trimethylsilyl groups. If the transition metal complex contains only one triazacyclohexane ligand, i.e. m=1, one of the substituents $R^1$ to $R^9$ can also bear a donor group which is connected via a bridge to the ring system and occupies a coordination position around the metal atom. Possible donor groups of this type are, in particular, nitrogen-containing functions such as dialkylamino groups. If the transition metal complex bears two triazacyclohexane ligands, i.e. m is 2, a radical $R^1$ to $R^9$ together with one of the substituents from the other triazacyclohexane ring may also form a bridge between the two rings. Possible bridges are all bridges which are known to a person skilled in the art, for example from similar metallocene complexes, i.e. especially silyl- or carbon-containing bridges. As in the case of the metallocene complexes, bridged complexes having various symmetries (e.g. $C_S$, $C_{2v}$) have the advantage that they are suitable for preparing syndiotactic or isotactic polypropylene.

However, triazacyclohexane ligands having simple substitution patterns can also be used advantageously, particularly for preparing polyethylene or for preparing copolymers of ethylene with higher α-olefins. Thus, for example, very good polymerization results can be achieved using transition metal complexes which have only one triazacyclohexane ring which is substituted by simple $C_1$–$C_{12}$-alkyl radicals on the nitrogen atom. Possible alkyl substituents are, in particular, methyl, ethyl, propyl, butyl, hexyl and octyl radicals. In an advantageous embodiment of the process of the present invention, $R^1$, $R^2$ and $R^3$ are therefore $C_1$–$C_{12}$-alkyl or $C_6$–$C_{15}$-aryl or arylalkyl. In a further advantageous embodiment of the process, the substituents $R^4$, $R^5$, $R^6$, $R^7$, $R^8$ and $R^9$ are hydrogen or $C_1$–$C_4$-alkyl. Hydrogen or methyl groups are particularly useful as $R^4$, $R^5$, $R^6$, $R^7$, $R^8$ and $R^9$, since such derivatives can be prepared particularly simply as condensation product of formaldehyde or acetaldehyde with appropriate amines.

Possible substituents X are, in particular, halogens, especially chlorine. Simple alkyl radicals such as methyl, ethyl, propyl or butyl are also advantageous ligands X. Further ligands X which may be mentioned purely by way of example and do not constitute an exhaustive listing are trifluoroacetate, $BF_4$—, $PF_6$— and noncoordinating anions such as $B(C_6F_5)_4$—. The number of ligands X depends on the oxidation state of the transition metal M. The number n can thus not be defined generally, but can assume different values for each particular transition metal. These values, i.e. the oxidation states of the individual transition metals in catalytically active complexes, are known to those skilled in the art. Thus, the appropriate complexes of titanium, zirconium and hafnium have, in particular, the oxidation state +4, chromium, molybdenum and tungsten are preferably present in the oxidation state +3, while iron and nickel are preferably used in the oxidation state +2.

A particularly large number of variation opportunities for preparing tailored catalyst systems are conceivable when the substitution pattern of the complexing ligands is unsymmetrical. Preference is therefore also given to transition metal complexes of the formula I in which at least one of the radicals $R^1$, $R^2$ or $R^3$ is different from the other two of these radicals. Such unsymmetrically substituted triazocyclohexane complexes or the ligands on which these complexes are based can, for example, be prepared by the following methods:

1) By reaction of a mixture of two primary amines ($R^1NH_2$ and $R^2NH_2$) with formaldehyde (aqueous solution or paraformaldehyde), which leads to a mixture of various products which can be separated as follows:
   a) Distillation of the product when $R^1$ and $R^2$ are sufficiently small.
   b) Carrying out the reaction using a large excess of the amine $R^1NH_2$, when the symmetrical reaction product can be distilled off. The unsymmetrical product then remains after distillation.
   c) Selective crystallization of one product.
   d) Complexing of the mixture by means of $CrCl_3$ and separation of the complexes by column chromatography.

2) By reaction of an amine $R^1NH_2$ with an excess of formaldehyde to give a mixture of symmetrically substituted product and the corresponding 1-oxa-3,5-diazacyclohexane. In a second step, the 1-oxa-3,5-diazacyclohexane can be reacted under normal conditions with another amine $R^2NH_2$ (possibly in the presence of an acid catalyst) so as to replace the oxygen by $R^2N$. The separation of the product mixture can be carried out as under 1):

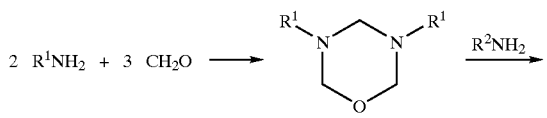

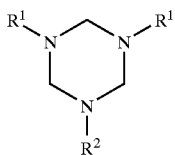

3) By reaction of a symmetrical triazacyclohexane having a small radical $R^1$ (Me or Et) with another amine $R^2NH_2$ at about 130° C. At this temperature, $R^1NH_2$ is given off and a mixture of the conceivable unsymmetrical triazacyclohexanes is formed. The separation is carried out as under 1):

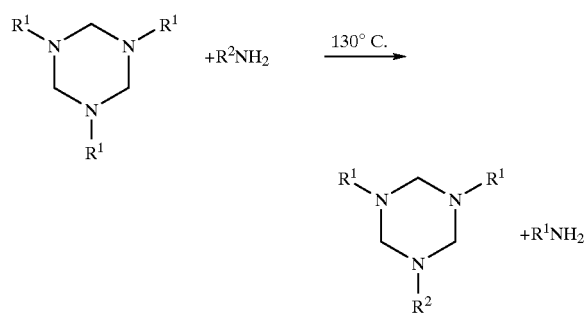

4) By reaction of two different symmetrical triazacyclohexanes with one another. Exchange of substituents can occur in a slow reaction. The products can be separated as under 1).

Bridged triazacyclohexanes can also be obtained by these methods.

A bridge between two triazacyclohexane ligands makes it possible to obtain chiral complexes which can be used advantageously for the preparation of tactic polypropylene. In addition, the bridge also sets an opening angle on the active center of the catalyst complex by means of which further polymerization properties can be adjusted. Particular preference is therefore also given to transition metal complexes of the formula I in which m is 2 and a radical $R^1$ to $R^9$ of in each case one triazacyclohexane ring together with one of the substituents from the other triazacyclohexane ring forms a bridge between the two rings.

The process of the present invention for the polymerization of olefins can be combined with all industrially known polymerization processes. The advantageous pressure and temperature ranges for carrying out the process therefore depend strongly on the polymerization method. The catalyst systems used according to the present invention can thus be employed in all known polymerization processes, i.e., for example, in high-pressure polymerization processes, in tube reactors or autoclaves, in suspension polymerization processes, in solution polymerization processes or in gas-phase polymerization. In the case of high-pressure polymerization processes, which are usually carried out at pressures in the range from 1 000 to 4 000 bar, in particular from 2 000 to 3 500 bar, high polymerization temperatures are also set as a rule. Advantageous temperature ranges for these high-pressure polymerization processes are from 200 to 380° C., in particular from 220 to 270° C. In the case of low-pressure polymerization processes, the temperature set is generally at least a few degrees below the softening temperature of the polymer. In particular, temperatures in the range from 50 to 180° C., preferably from 70 to 120° C., are set in these polymerization processes. The pressures here are usually in the range from 1 to 40 bar, preferably from 5 to 40 bar. Among the abovementioned polymerization processes, gas-phase polymerization, in particular in gas-phase fluidized-bed reactors, and suspension polymerization, in particular in loop reactors, are particularly preferred according to the present invention.

Various olefinically unsaturated compounds can be polymerized by the process of the present invention. In contrast to some known iron and cobalt complexes, the transition metal complexes used according to the present invention display good polymerization activity even in the case of higher α-olefins and polar comonomers, so their suitability for copolymerization is worthy of particular mention. Possible olefins are particularly ethylene and α-olefins having from 3 to 8 carbon atoms, but also dienes such as butadiene and polar monomers such as acrylic esters and vinyl acetate. Vinylaromatic compounds such as styrene can also be polymerized by the process of the present invention.

In a preferred embodiment of the process of the present invention, monomers used are mixtures of ethylene with $C_3$–$C_8$-α-olefins such as propene, 1-butene, 1-pentene, 1-hexene, 1-heptene or 1-octene.

Some of the metal complexes designated as component (A) are themselves not polymerization-active and then have to be brought into contact with an activator, viz. component (B), in order to be able to display polymerization activity. Possible activator compounds are, for example, those of the aluminoxane type, in particular methylaluminoxane. Aluminoxanes are prepared, for example, by controlled addition of water to alkylaluminum compounds, in particular trimethylaluminum. Aluminoxane preparations suitable as cocatalyst are also commercially available. It is assumed that these are mixtures of cyclic and linear compounds. The cyclic aluminoxanes can be represented by the formula $(R^{10}AlO)_k$ and the linear aluminoxanes by the formula $R^{10}{}_2Al(R^{10}AlO)_k R^{10}$, where k can be from 1 to 50. $R^{10}$ is preferably a $C_1$–$C_6$-alkyl, e.g. methyl, ethyl, butyl or isobutyl, particularly preferably methyl. It is also possible for various radicals $R^{10}$ to be present in an aluminoxane. Advantageous aluminoxanes comprise essentially aluminoxane oligomers having a degree of oligomerization of from about 5 to 30.

As well as aluminoxanes, it is also possible to use activator components as are employed in the cationic activation of metallocene complexes. Such activator components are known from, for example, EP-B1-0468537 and EP-B1-0427697. In particular, boranes or borates can be used as such activator compounds (B). Particular preference is given to using boranes or borates which bear at least two substituted aryl radicals. A particularly useful borate is dimethylanilinium tetrakispentafluorophenylborate, and a particularly preferred borane is trispentafluorophenylborane.

Further activator components which can be used are compounds such as aluminum alkyls, in particular trimethylaluminum, aluminum trifluoride or perchlorates. The aluminum alkyls can at the same time be used for reacting with and thus removing water or other impurities.

It is sometimes desirable to use a combination of various activators. This is known, for example, in the case of metallocenes where boranes and borates are often used in combination with an aluminum alkyl. A combination of various activator components with the transition metal complex used according to the present invention is generally also possible.

The amount of activator compounds to be used depends on the type of activator. In general, the molar ratio of transition metal complex (A) to activator compound (B) can be from 1:0.1 to 1:10 000, preferably from 1:1 to 1:1 000.

The molar ratio of transition metal complex (A) to dimethylanilinium tetrakispentafluorophenylborate is preferably in the range from 1:1 to 1:20 and particularly preferably from 1:1 to 1:15, while that to methylaluminoxane is preferably in the range from 1:1 to 1:3 000, and particularly preferably from 1:10 to 1:500. The amount of activator compound can be used to control not only the activity of the catalyst but also polymer properties such as the molecular weight. The optimum amount accordingly varies as a function of the desired activity/polymer properties and depending on the respective transition metal complex and can be determined by simple experimentation.

The transition metal complex can be brought into contact with the activator compound or compounds either before or after it is brought into contact with the olefins to be polymerized. Preactivation using one or more activator compounds prior to mixing with the olefin and further addition of the same or different activator compounds after this mixture has been brought into contact with the olefin is also possible. Preactivation is generally carried out at 10–100° C., preferably 20–80° C.

It is also possible for more than one of the transition metal complexes used according to the present invention to be simultaneously brought into contact with the olefin to be polymerized. This has the advantage that a further range of polymers can be produced in this way. For example, bimodal products can be prepared in this manner.

A likewise broad product spectrum can be achieved by use of the complexes employed according to the present invention in the presence of a catalyst customary for the polymerization of olefins. Catalysts which can be used here are, in particular, classical Ziegler-Natta catalysts based on titanium, classical Phillips catalysts based on chromium oxides, metallocenes (cf., for example, Coville et al., J. Orgmet. Chem. 479 (1994) 1–29), constrained geometry complexes (cf., for example, EP-A-416815 or EP-A-420436), nickel- and palladium-bisimine systems (for the preparation of these, see WO-A-98/03559), iron- and cobalt-pyridinebisimine compounds (for the preparation of these, see WO-A-98/27124) or titanium- and zirconium-Schiff base complexes (cf., for example, EP-A-874 005). Thus, for example, bimodal products can also be prepared or comonomers can be generated in situ by means of such combinations.

The transition metal complexes (A) used according to the present invention can also optionally be immobilized on an organic or inorganic support and be used in supported form in the polymerization. In this way, catalysts for the polymerization of olefins which comprise at least one transition metal complex (A) and, if desired, one or more activator compounds (B) and a support material are obtained. This is a customary method of avoiding deposits in the reactor and of controlling the polymer morphology. Support materials used are preferably silica gel, magnesium chloride, aluminum oxide, mesoporous materials, aluminosilicates and organic polymers such as polyethylene, polypropylene or polystyrene, in particular silica gel or magnesium chloride. The support material can also be dried or calcined prior to being brought into contact with the transition metal complex or the activator compound.

The activator compound(s) (B) and one or more transition metal complexes (A) can be brought into contact with the support material in various orders or simultaneously. This is generally carried out in an inert solvent which is separated off by filtration or evaporated after the immobilization. It is also possible to use the supported catalysts while still moist.

Thus, the mixture of the support material can firstly be brought into contact with the activator compound or compounds (B) or the support material can firstly be brought into contact with the transition metal complex (A). It is also possible for the transition metal complex (A) to be precontacted with one or more activator compounds (B) prior to mixing with the support. The preferred procedure is for a mixture of the transition metal complex (A) with one or more activator compounds (B) to be mixed with the support material and subsequently dried. The amount of metal complex (A) (in mmol) per gram of support material can vary greatly, e.g. between 0.001 to 1 mmol/g. The preferred amount of metal complex (A) per gram of support material is in the range from 0.001 to 0.5 mmol/g, particularly preferably from 0.005 to 0.1 mmol/g. In a possible embodiment, the metal complex (A) can also be prepared in the presence of the support material. A further method of immobilization is prepolymerization of the catalyst system with or without prior application to a support.

These supported catalyst systems are particularly useful in processes for the polymerization or copolymerization of olefins. Possible olefins include not only ethylene and $\alpha$-olefins having from 3 to 12 carbon atoms but also internal olefins and nonconjugated and conjugated dienes such as butadiene, 1,5-hexadiene or 1,6-heptadiene, cyclic olefins such as cyclohexene, cyclopentene or norbornene, polar monomers such as acrylic esters, acrolein, acrylonitrile, vinyl alcohol and vinyl acetate or vinylaromatic compounds such as styrene. Preference is given to polymerizing at least one olefin selected from the group consisting of ethene, propene, 1-butene, 1-pentene, 1-hexene, 1-heptene, 1-octene and 1-decene. In a preferred embodiment of the process of the invention, the monomers used are mixtures of ethylene or propylene with one another or with $C_4$–$C_{12}$-$\alpha$olefins.

The process of the present invention makes it possible to prepare polymers and copolymers of olefins over a broad molecular weight range.

The preparation of various triazacyclohexane ligands has been known for a long time. The simplest route is the condensation reaction of aldehydes such as formaldehyde with appropriately substituted amines, in particular alkylamines. Various synthetic routes for these complexing ligands are described, for example, in Beilstein, "Handbook of organic Chemistry", 4th Ed., Vth Suppl. Series, Springer-Verlag, Berlin, Vol. 26 (1986) p. 3ff and Ref.; R=Octyl: D. Jamois et al J. Polym. Sci., Polym. Chem. Ed. 329 (1993), 1941–1958; A. G. Giumanini, G. Verardo et al. J. Prakt. Chem. 327 (1985), 739–748, K. Bhatia, Exoon Chemical Patents inc., EP 620266 (1994); F. Seng, K. Ley, Bayer A G, DE 2431862 (1979); H. J. Ha, G. S. Nam, Korea Institute of Science and Technology, DE 4100856 (1991) and H. M öhrle, D. Schnödelbach, Pharmazie 30 (1975), 699–706. The metal complexes, in particular the chromium complexes, can be obtained in a simple manner by reacting the corresponding metal chlorides or metal carbonyls with the ligand.

The following examples illustrate the invention.

The following abbreviations and measurement methods were employed:

The comonomer content of the polymers (% $C_6$) and their methyl side chain content per 1 000 carbon atoms of the polymer chain ($CH_3$/1 000) were determined by IR spectroscopy.

The $\eta$ value was determined by means of an automatic Ubbelohde viscometer (Lauda PVS 1) using decalin as solvent at 130° C. (ISO01628 at 130° C., 0.001 g/ml of decalin). The density was determined in accordance with ISO 1183.

The determination of the molecular weight distributions and the mean values $M_n$, $M_w$ and $M_w/M_n$ derived therefrom was carried out by means of high-temperature gel permeation chromatography using a method based on DIN 55672 under the following conditions: solvent: 1,2,4-trichlorobenzene, flow: 1 ml/min, temperature: 140° C., calibration using PE standards.

Abbreviations:
$T_p$ polymerization temperature
$M_w$ weight average molecular weight
$M_n$ number average molecular weight
Q polydispersity (ratio of $M_w$ to $M_n$)
m.p. melting point of the polymer
η Staudinger index (viscosity); eta value
$CH_3/1000$ number of methyl side chains per 1 000 carbon atoms
MAO methylaluminoxane
Am pentyl
$^t$Bu tert-butyl
Bz benzyl
Cy cyclohexyl
Do dodexyl [sic]
Me methyl
Oc octyl
Phet 1-(S)-phenylethyl
iPr isopropyl
TAC 1,3,5-triazacyclohexane
Tf triflate
Xy 1,3-xylene-1,3-diyl

EXAMPLE 1

Preparation of 1,3,5-trioctyl-1,3,5-triazacyclohexane ($Oc_3TAC$)

100 g (0.774 mmol [sic]) of octylamine were added in small portions to a suspension of 20.2 g (0.673 mmol [sic]) of paraformaldehyde in 500 ml of toluene which had been cooled to 0° C. and the mixture was then heated to boiling, resulting in the paraformaldehyde going into solution. Toluene and water were distilled off. The residue was freed of remaining volatiles in an oil pump vacuum and then taken up in 100 ml of methanol, filtered through a short silica gel column and all volatile constituents were subsequently removed in an oil pump vacuum. The product was obtained as a viscous clear liquid in a yield of 82.3 g (83%).

Preparation of ($Oc_3TAC$)$CrCl_3$ 662 mg (1.768 mmol) of $CrCl_3(THF)_3$ and 728 mg (1.855 mmol) of $Oc_3TAC$ were placed in a flask. 100 ml of dry ether were condensed into the flask and the resulting suspension was stirred for about half an hour. After filtration through a frit, the residue on the filter was washed with ether until the filtrate no longer displayed a green color. The product was dried thoroughly under reduced pressure. Yield: 885 mg (98%).

EXAMPLE 2

Preparation of 1,3,5-tripentyl-1,3,5-triazacyclohexane ($Am_3TAC$)

4.35 g (49.9 mmol) of n-pentylamine were added in small portions to a suspension of 1.44 g (48 mmol) of paraformaldehyde in 50 ml of toluene which had been cooled to 0° C. and the mixture was then heated to boiling, resulting in the paraformaldehyde going into solution. Toluene and water were distilled off. The residue was freed of remaining volatiles in an oil pump vacuum and then taken up in 50 ml of methanol, filtered through a short silica gel column and all volatile constituents were subsequently removed in an oil pump vacuum. The product was obtained as a viscous clear liquid in a yield of 4.47 g (15 mmol; 94%).

Preparation of ($Am_3TAC$)$CrCl_3$ 532 mg (1.42 mmol) of $CrCl_3(THF)_3$ and 458 mg (1.54 mmol) of $Am_3TAC$ were placed in a flask. 100 ml of dry ether were condensed into the flask and the resulting suspension was stirred for about half an hour. After filtration through a frit, the residue on the filter was washed with ether until the filtrate no longer displayed a green color. The product was thoroughly dried under reduced pressure. Yield: 557 mg (86%).

EXAMPLE 3

Polymerizations

The appropriate amount of MAO (as a 30% strength solution in toluene, manufacturer: Albemarle) and 400 ml of isobutane were placed in a 1 l autoclave. After the autoclave had been pressurized with ethylene to a pressure of 40 bar and heated to 70° C., the appropriate amount of catalyst was in each case introduced via a lock. After 60 minutes, the polymerizations were stopped by venting.

Polymerization conditions and product property data are shown in Table 1.

TABLE 1

| Sample Complex | Amount [mg] | MAO [mmol] | Al:Cr | $T_p$ [° C.] | Activity [kg/molCrh] | Yield [g] ([min]) | Density [g/cm$^3$] | Eta [dl/g] | $M_w$ [g/mol] | $M_n$ [g/mol] | Q — |
|---|---|---|---|---|---|---|---|---|---|---|---|
| ($Am_3TAC$)$CrCl_3$ | 49 (107 µmol) | 35 | 325 | 70 | 4130 | 74 (10) | 0.9741 | 0.34 | 5282 | 1345 | 3.93 |
| ($Oc_3TAC$)$CrCl_3$ | 6 (10 µmol) | 5 | 500 | 70 | 14844 | 153 (60) | 0.9585 | 0.73 | 39792 | 10608 | 3.75 |
| ($Am_3TAC$)$CrCl_3$ | 6 (13 µmol) | 5 | 384 | 70 | 13083 | 172 (60) | 0.966 | 1.21 | 40165 | 8894 | 4.52 |

EXAMPLE 4

Preparation of Me$_2$(Me$_2$NCH$_2$CH$_2$CH$_2$)TAC

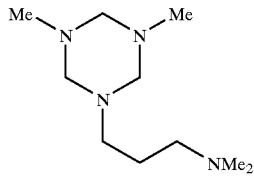

140 g of formaldehyde solution in water (37%, 1.73 mol) were added to a mixture of 50 ml of methylamine solution in water (40%, 580 mmol) and 34 ml of N,N-dimethyltrimethylenediamine (276 mmol) while cooling in ice. 250 g of KOH were added over a period of 2 hours and the mixture was stirred for another 20 hours. The organic phase was separated off and the aqueous phase was extracted a number of times with Et$_2$O. The combined organic phases were washed with water, evaporated and fractionally distilled at about 10$^{-2}$ torr. The crude product was distilled off as a colorless liquid at 50–60° C.

Yield: 9 g (16%)

$^1$H NMR (CDCl$_3$, 80 MHz): 3.03s (4H, MeNCH$_2$NR), 2.95s (2H, MeNCH$_2$NMe), 2.34t (J=7.3 Hz, 2H, NCH$_2$), 2.08t (J=7 Hz, 2H, CH$_2$NMe$_2$), 2.01s (6H, MeN), 1.98s (6H, NMe$_2$), 1.42m (2H, CCH$_2$C)

EXAMPLE 5

Preparation of Me$_2$(HOCH$_2$CH$_2$)TAC

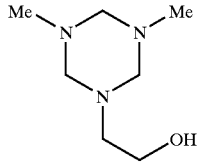

1 ml of ethanolamine (17 mmol) were dissolved in 80 ml of Me$_3$TAC and heated at 130° C. for 12 hours (evolution of gas). Distilling off the excess Me$_3$TAC (60° C./0.01 torr) gave 2 g of crude product. 10 ml of methylamine (40% in water) were added, the mixture was stirred for 12 hours and the volatiles were again removed under reduced pressure. The residue was volatilized and recondensed by brief heating with a Bunsen burner under reduced pressure.

Yield: 1.2 g (46%) of a colorless oil.

$^1$H NMR (CDCl$_3$, 200 MHz): 5.35br (1H, HO), 3.50t (2H, HOCH$_2$), 3.14br (6H, NCH$_2$N), 2.79t (2H, NCH$_2$), 1.97s (6H, NMe$_2$)

EXAMPLE 6

The procedure of Example 5 was repeated using 1 ml of ethanolamine (17 mmol) and 80 ml of Et$_3$TAC to give 1.4 g of Et$_2$(HOCH$_2$CH$_2$)TAC:

$^1$H NMR (CDCl$_3$, 200 MHz): 5.74br (1H, HO), 3.62t (2H, CH$_2$OH), 3.29br (6H, NCH$_2$N), 2.85t (2H, NCH$_2$CH$_2$OH), 2.24t (4H, NCH2CH$_3$), 0.99q (4H, NCH$_2$CH$_3$).

EXAMPLE 7

Preparation of 1,3-di(1-methylene-3,5-diethyl-1,3,5-triazacyclohexyl)benzene

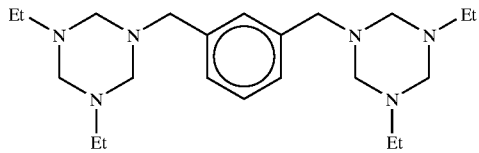

95 ml of ethylamine (70% in water, 1.13 mol) and 9 ml of m-xylylamine (0.07 mol) were dissolved in 150 ml of ethanol and, while stirring vigorously and cooling by means of water, 39 g of paraformaldehyde (1.3 mol) were added. When all the paraformaldehyde had dissolved and the mixture had cooled to 20° C., the solvent and Et$_3$TAC were distilled off at 70° C./0.01 torr. The remaining colorless, viscous liquid was heated with a Bunsen burner under reduced pressure until fuming commenced. After cooling, the oil was dissolved in 50 ml of ether and filtered through a short column of neutral aluminum oxide. The solution was dried by stirring overnight with a little sodium, filtered again through aluminum oxide and the solvent was removed under reduced pressure.

Yield: 22 g (86%)

$^1$H NMR (CDCl$_3$, 200 MHz): 7.1–6.7 (4H, aromatic CH), 3.60t (4H, NCH$_2$), 3.29br (6H, NCH$_2$N), 2.42t (8H, NCH$_2$CH$_3$), 0.99q (12H, NCH$_2$CH$_3$)

EXAMPLE 8

Preparation of 1,3-di(1-methylene-3,5-dimethyl-1,3,5-triazacyclohexyl)benzene

The synthesis was carried out by a method analogous to Example 7.

$^1$H NMR (CDCl$_3$, 200 MHz): 7.4–6.9 (4H, aromatic CH), 3.67t (4H, NCH$_2$), 3.19br (6H, NCH$_2$N), 2.16s (12H, NMe$_2$)

EXAMPLE 9

Preparation of 1,6-di(1-3,5-di-tert-butyl-1,3,5-triazacyclohexyl)hexane

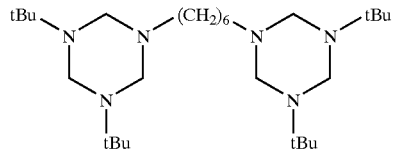

While cooling by means of water, 15 g of paraformaldehyde (500 mmol) were added to 39 g of $^t$BuNH$_2$ (535 mmol) and 1.2 g of 1,6-diaminohexane (10 mmol). After stirring the mixture for 30 minutes, 7.5 g of KOH were added and the mixture was stirred for another 30 minutes. The organic phase was taken off and $^t$Bu$_3$TAC was distilled off at 100° C./0.01 torr. The residue was taken up in 10 ml of pentane, filtered and the solution was cooled to −78° C. (dry ice). The precipitate formed was separated off, recrystallized from 10 ml of pentane at −78° C. and dried under reduced pressure.

Yield: 2.6 g (50%) of a colorless solid, m.p. 85–90° C.

$^1$H NMR (CDCl$_3$, 200 MHz): 3.44 br (4H, $^t$BuNCH$_2$N$^t$Bu), 3.33br (8H, $^t$BuNCH$_2$NCH$_2$), 2.39t (4H, NCH$_2$), 1.2–1.3m (8H, CH$_2$), 0.98s (18H, $^t$Bu)

EXAMPLE 10

Preparation of 1-isopropyl-3,5-octyl-1,3,5-triazacyclohexane

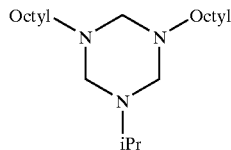

130 g of n-octylamine (1.0 mol) were added to 120 g of formalin (37% in water) and 200 ml of methanol (warming) and stirred in a waterbath for 2 hours. After addition of 400 ml of hexane, the organic phase was separated off, washed with water and freed of solvent under reduced pressure. This gave 150 g of a colorless oil which, according to NMR, consists of a mixture of $Oc_3TAC$ and 1-3,5-dioctyloxa-1,5-diazacyclohexane.

2.2 g of this mixture were admixed with 0.8 g of isopropylamine and a little p-toluenesulfonic acid. After 2 days, the mixture was washed with aqueous KOH, then with water, dissolved in pentane, filtered through aluminum oxide and the solvent was removed under reduced pressure. This left a mixture of $Oc_3TAC$ and $^iPrOc_2TAC$.

A solution of the mixture in toluene was dried by means of sodium, filtered, admixed with excess $CrCl_3$ and a little zinc powder and heated to boiling. The $CrCl_3$ went into solution (violet). After cooling, the mixture was chromatographed on a silica gel column using first $CHCl_3$ and then acetone. The separate violet bands of $[Oc_3TACCrCl_3]$ and $[^iPrOc_2TAC\ CrCl_3]$ were collected and the solvent was removed.

EXAMPLE 11

Preparation of 1,3,5-trimethyl-1,3,5-triazacyclohexane 1,3,5-Trimethyl-1,3,5-triazacyclohexane (0.1 ml, 0.71 mmol) (dried over molecular sieves) was added to a solution of $(THF)_3\ CrCl_3$ (117 mg, 0.47 mmol) in 20 ml of THF at room temperature. After stirring for 30 minutes, the violet precipitate was filtered off and washed with diethyl ether. Drying under reduced pressure gave 122 mg (90%) of violet powder (melting point: 270° C. (decomp.)).

EXAMPLE 12

Preparation of 1,3,5-tridodecyl-1,3,5-triazacyclohexane 103.5 g of dodecylamin (558 mmol) were dissolved in 200 ml of toluene, after which 16.75 g of paraformaldehyde (558 mmol) were added. After stirring the mixture for 1 hour, the toluene/water azeotrope was distilled off until a boiling point of 110° C. had been reached. The remaining toluene was distilled off on a rotary evaporator, the residue was dissolved in 1 l of ethanol and cooled to −30° C. The resulting colorless solid was cooled at −30° C. after standing for 2 hours and the solid was, after filtration, combined with the first. Drying under reduced pressure gave 103 g of $DO_3TAC$ (94%) as a colorless, viscous liquid.

Melting point: 183° C.

IR (KBr, v/cm$^{-1}$): 919m, 948m, 1020m, 1094m, 1114m, 1131m, 1157w, 1172w, 1216w, 1245w, 1261w, 1320w, 1327w, 1336w, 1360w, 1378w, 1396w, 1457m, 1469m, 2851s, 2872s, 2921s, 2954s

UV/Vis (THF) in nm ($\epsilon$ in cm$^{-1}$ mol$^{-1}$l): 718 (680), 505 (1280), 338 (3390)

Magnetic moment by the Evans method: 3.80 $\mu_B$

Preparation of [1,3,5-tridodecyl-1,3,5-triazacyclohexane]chromium trichloride a) 40 ml of ether (dried over Na/benzophenone) were condensed onto 2.02 g of $[CrCl_3(THF)_3]$ (5.4 mmol) and 3.20 g of $DO_3TAC$ (5.4 mmol) and the suspension was stirred for 30 minutes. The violet solid was separated off by filtration and washed with ether. Drying under reduced pressure gave 3.65 g of product (90%).

b) 40.4 g of $DO_3TAC$ (68 mmol) were dissolved in 500 ml of toluene. After a few ml of toluene had been distilled off (boiling point: 110° C.) and the solution had been cooled in a stream of argon, 11.4 g of anhydrous $CrCl_3$ (72 mmol) were added. After again distilling off a few ml of toluene and cooling in a stream of argon, 1.0 g of Zn powder was added. After distilling off the chloroform, the violet, solid residue was washed with ether and dried under reduced pressure. The residue was dissolved in chloroform and purified by column chromatography over silica gel (200 ml). The violet solution eluted by means of chloroform was collected and the solvent was removed under reduced pressure. This gave 36.3 g (71%) of the violet complex.

EXAMPLE 13

Preparation of [1,3,5-tricyclohexyl-1,3,5-triazacyclohexane]-vanadium trichloride 10 ml of THF (dried over Na/benzophenone) were condensed onto 600 mg of $[VCl_3(THF)_3]$ (1.6 mmol) and 590 mg of cyclohexyl$_3$TAC (1.8 mmol) and the suspension was stirred for 60 minutes. The violet solid was separated off by filtration and washed with 2 ml of THF. Drying under reduced pressure gave 0.65 g of product (80%).

Melting point: 240–241° C.

$^1$H NMR (200 MHz, $CD_3NO_2$/$CDCl_3$(1:2))): δ 32.4 (3H, $\Delta v_{1/2}$ 80 Hz), 2.82 (6H, $\Delta v_{1/2}$ 37 Hz), 2.08 (6H, $\Delta v_{1/2}$ 70 Hz), 1.07 (3H, $\Delta v_{1/2}$ 15 Hz), 0.98 (3H, $\Delta v_{1/2}$ 21 Hz), 0.92 (6H, $\Delta v_{1/2}$ 14 Hz), −0.07 (6H, $\Delta v_{1/2}$ 17 Hz), −3.66 (3H, $\Delta v_{1/2}$ 180 Hz), −4.16 (3H, $\Delta v_{1/2}$ 82 Hz)

IR (KBr, v/cm$^{-1}$): 442m, 518w, 540s, 841m, 896m, 918s, 948s, 974s, 988s, 1017s, 1032s, 1042m, 1053s, 1068s, 1078sm, 1095s, 1120s, 1152m, 1171s, 1193m, 1199s, 1211m, 1257m, 1277m, 1312m, 1337m, 1351m, 1380s, 1395m, 1408m, 1447s, 1452s, 1465s, 1485m, 2853s, 2929s, 2964s, 2991m

Reflectance UV/vis (KBr compact) in nm: 853, 546, 408

EXAMPLE 14

Preparation of [1,3,5-trioctyl-1,3,5-triazacyclohexane]chromium Tristriflate 10 ml of trifluoromethanesulfonic acid (TfOH) were condensed onto 1.1 g of $[(octyl_3TAC)CrCl_3]$ (1.9 mmol). During thawing, the complex dissolved in the acid with evolution of gas (HCl) to give a turquoise solution. The gas was continuously distilled off at room temperature under reduced pressure. Washing with ether and drying under reduced pressure gave 1.2 g (70%) of the turquoise product.

EXAMPLE 15

Preparation of 1-benzyl-3,5-dimethyl-1,3,5-triazacyclohexane 9 ml of benzylamine (82 mmol) and 100 ml of methylamine (40% strength in water, 1.2 mol) were dissolved in 500 ml of ethanol, after which 40 g of paraformaldehyde (1.33 mol) were added and the mixture was stirred. After the paraformaldehyde had dissolved and the solution had been cooled to room temperature, the solvent was removed on a rotary evaporator and the residue was distilled at 80–90° C./1.3 Pa. The distillate was dissolved in pentane and stirred with sodium for 48 hours. Filtration and removal of the solvent under reduced pressure left 5 g (30%) of a colorless oil.

MS (70 eV, 80° C.): 205 (M+, 34%), 204/–H)$^+$, 23%), 162 ((M–(H$_2$C=NMe))$^+$, 58%)

$^1$H NMR (200 MHz, CDCl$_3$): δ 7.3–7.1 (5H, Ph), 3.7s (2H, CH$_2$Ph), 3.2br (6H, ring CH$_2$), 2.2s (6H, Me)

$^{13}$C-NMR (50 MHz, CDCl$_3$: δ 139.6, 128.4, 128.0, 126.7 (Ph), 78.3, 74.7 (ring CH$_2$), 56.6 (CH$_2$Ph), 39.9 (Me)

IR (KBr, v/cm$^{-1}$): 461m, 481m, 699m, 743m, 836m, 862s, 917m, 982s, 1003m, 1009m, 1028m, 1050s, 1062s, 1076s, 1114m, 1144m, 1195s, 1234m, 1263w, 1311w, 1361m, 1384m, 1396s, 1418s, 1427s, 1453w, 1469m, 1495s, 1585s, 1605s, 1682s, 2601s, 2627s, 2642s, 2684s, 2726s, 2790w, 2838s, 2852s, 2939w, 2965m, 3027s, 3061s

Preparation of [1-benzyl-3,5-dimethyl-1,3,5-triazacyclohexane]-chromium Trichloride 1.0 g of (benzyl)Me$_2$TAC (4.9 mmol) and 1.8 g of CrCl$_3$(THF)$_3$ (4.8 mmol) were stirred in 20 ml of diethyl ether. After 30 minutes, the solvent was removed under reduced pressure, more ether was added and removed again under reduced pressure a total of three times, the residue was then washed with ether and dried under reduced pressure. This gave 1.2 g of violet [((benzyl)Me$_2$TAC)CrCl$_3$] (68%), melting point: 244–246° C.

MS (70 eV, 200° C.): 290 ((M–2(HCl))$^+$, 1%)

Elemental analysis (calc.): C 38.8 (39.6), H 5.7 (5.3), N 10.9 (11.6), Cl 28.7 (29.3)

IR (KBr, v/cm$^{-1}$): 413m, 422m, 470m, 512s, 558m, 660m, 708m, 769m, 884m, 888m, 892m, 897m, 924w, 944w, 962m, 971m, 1009w, 1028m, 1070m, 1103w, 1118w, 1139m, 1164w, 1186m, 1205m, 1259w, 1278w, 1304m, 1341m, 1366s, 1384m, 1424m, 1453m, 1465w, 1480s, 1496s, 1584s, 1640s, 1685m, 2795m, 2876m, 2929s, 2980s, 3005s, 3029s, 3061m, 3086m, 3106m

EXAMPLE 16

Preparation of 1,3-dimethyl-5-octyl-1,3,5-triazacyclohexane 9 ml of octylamine (55 mmol) and 100 ml of methylamine (40% strength in water, 1.2 mol) were dissolved in 500 ml of ethanol, after which 40 g of paraformaldehyde (1.33 mol) were added and the mixture was stirred. After the paraformaldehyde had dissolved and the mixture had cooled to room temperature, the solvent was taken off on a rotary evaporator and the residue was distilled at 90° C./1.3 Pa. The distillate was dissolved in pentane and stirred with sodium for 48 hours. Filtration and removal of the solvent under reduced pressure left 8 g (65%) of a colorless oil.

MS (70 eV, 23° C.): 226 ((M–H)$^+$, 4%) 184 ((M–H$_2$C=nMe))$^+$, 10%)

$^1$H NMR (200 MHz, CDCl$_3$): δ 3.2br (6H, ring CH$_2$), 2.5t (2H, N—CH$_2$C$_7$H$_{15}$), 2.2s (6H, Me), 1.2–1.4 (12H, N—CH$_2$C$_6$H$_{12}$Me), 0.8t (3H, N—CH$_2$C$_6$r$_{12}$Me)

$^{13}$C-NMR (50 MHz, CDCl$_3$): δ 78.3, 75.2 (ring CH$_2$), 52.5 (N—CH$_2$C$_7$H$_{15}$), 40.0 (Me), 31.6, 29.3, 29.1, 27.8, 27.2, 22.5, 13.9 (N—CH$_2$C$_7$H$_{15}$)

IR (KBr, v/cm$^{-1}$): 724m, 834m, 860m, 86$^4$m, 915m, 981w, 1003s, 1026m, 1049m, 1116s, 1147s, 1234m, 1262s, 1370m, 1385m, 1426w, 1444w, 1467m, 2596m, 2626m, 2726s, 2786s, 3854s, 2927s, 2953s

Preparation of [1,3-dimethyl-5-octyl-1,3,5-triazacyclohexane]-chromium Trichloride 1.5 g of (octyl)Me$_2$TAC (6.6 mmol) and 2.4 g of CrCl$_3$ (THF)$_3$ (6.4 mmol) were stirred in 20 ml of diethyl ether. After 30 minutes, the solvent was removed under reduced pressure, more ether was added and removed again under reduced pressure a total of three times, the residue was then washed with ether and dried under reduced pressure. This gave 2.1 g of violet [((octyl)Me$_2$TAC)CrCl$_3$] (82%), melting point: 187°C.

MS (70 eV, 200° C.): 312 ((M–2(HCl))$^+$, 1%) plus some 410 ((M'–2(HCl))$^+$) of [((octyl)$_2$MeTAC)CrCl$_3$]

Elemental analysis (calc.): C 41.3 (40.5), H 7.7 (7.6), N 10.7 (10.9), Cl 25.5 (27.6)

calculated for mixture with 8% of [((octyl)$_2$MeTAC)CrCl$_3$]: C 41.4, H 7.7, N 10.7, Cl 27.0

IR (KBr, v/cm$^{-1}$): 420m, 512w, 531s, 535s, 539s, 543s, 724s, 925w, 1006w, 1083w, 1116w, 1168m, 1236s, 1257m, 1281s, 1378s, 1418s, 1469m, 1642s, 1687s, 2855s, 2927m, 2956s

EXAMPLE 17

Preparation of [1,3,5-tri(S-1-phenylethyl)-1,3,5-triazacyclohexane]chromium Trichloride 540 g of [CrCl$_3$(THF)$_3$](1.45 mmol) and 550 mg of (S-Phet)$_3$TAC (1.38 mmol) were stirred in 20 ml of THF for 7 days until a sample of the suspension mixed with water gave a colorless solution and a violet precipitate. After addition of 60 ml of water, the violet solid was separated off by filtration and washed a number of times with ether. Drying under reduced pressure (40° C., 2 hours) gave 680 mg of product (90%). Melting point: 313° C. (slow decomposition above 250° C.) Specific rotation in CH$_2$Cl$_2$ (c=0.2 g/100 ml) [α]$_D^{20}$=–286°

IR (KBr, v/cm$^{-1}$): 473m, 480m, 507m, 533m, 564s, 583m, 618m, 652m, 658m, 670m, 704s, 710s, 753s, 769m, 780s, 833m, 854m, 890m, 931s, 974s, 996s, 1009s, 1027s, 1032s, 1042s, 1055s, 1080s, 1105s, 1158s, 1168s, 1193m, 1204s, 1212s, 1231m, 1257s, 1310m, 1356m, 1366s, 1386s, 1394m, 1403m, 1453s, 1477m, 1497s, 1583m, 1602m, 1617m, 1899, 1974m, 1995m, 1865s, 2937s, 2979s, 3005m, 3028m, 3036m, 3062m

UV/Vis (THF) in nm (ε in cm$^{-1}$mol$^{-1}$l): 739 (140), 526 (280), 342 (23)

EXAMPLES 18 to 38

Procedure for the Polymerization Experiments

The polymerization experiments were carried out under argon using in each case between 5 to 20 μmol of the complexes (see Table 2) in 250 ml of absolute toluene at 40° C.

In the activation experiments using MAO, in each case the amount of 1.6 molar MAO in toluene indicated in Table 2 was added. When activation was carried out using borate, the appropriate amount of DMAB (dimethylanilinium tetrakis(pentafluorophenyl)borate) was added, the mixture was heated to 70° C. and subsequently admixed with Tibal (triisobutylaluminum) as indicated in Table 2. The solution was cooled again to 40° C. About 20–40 l/h of ethylene were then passed through the solution for one hour (at atmospheric pressure). In the copolymerization experiments, 5 ml Of hexene were initially introduced before the ethylene was passed through the solution, after which ethylene was passed through and the remaining amount of hexene was added via a dropping funnel over a period of 15 minutes. When butene was used, about 10–20 l/h of butene were passed through the solution together with the ethylene.

The reaction was stopped by addition of a mixture of 15 ml of concentrated hydrochloric acid and 50 ml of methanol and the mixture was stirred for another 15 minutes. After addition of 250 ml of methanol, the solid was filtered off, washed with methanol and dried at 70° C. Polymerization and product data are summarized in Table 2.

TABLE 2

| Ex. | Complex | Amount of complex [mg] | [µmol] | MAO [mmol] | Al:Cr | Cr:B[1] | Comonomer [ml] | $T_p$ [° C.] | Activity [kg/molCr · h] |
|---|---|---|---|---|---|---|---|---|---|
| 18. | [Am$_3$TAC]CrO$_3$ | 6.5 | 14.3 | 5.3 | 370:1 | — | — | 43 | 552 |
| 19 | [Am$_3$TAC]CrO$_3$ | 7.0 | 14.9 | 5.3 | 355:1 | — | — | 40 | 52.7 |
| 20 | [Oc$_3$TAC]CrTf$_3$ | 13.7 | 14.8 | 5.3 | 360:1 | — | — | 40 | 554 |
| 21 | [Oc$_3$TAC]CrCl$_3$ | 8.8 | 15.1 | 5.3 | 350:1 | — | — | 40 | 490 |
| 22 | [tBu$_3$TAC]CrCl$_3$ | 6.5 | 15.7 | 5.3 | 340:1 | — | — | 40 | 7.9 |
| 23 | [tBu$_3$TAC]CrCl$_3$ | 12.8 | 30.9 | 10.5 | 343:1 | — | — | 40 | 38.8 |
| 24 | [Me$_2$DoTAC]CrCl$_3$ | 12.7 | 15.2 | 5.3 | 350:1 | — | — | 40 | 3.3 |
| 25 | [DO$_3$TAC]CrCl$_3$ | 12.5 | 16.6 | 5.3 | 320:1 | — | — | 40 | 717 |
| 26 | [DO$_3$TAC]CrCl$_3$ | 15.2 | 20.2 | — | 80:1 | 1:1.5 | (C6)[2] 30 | 40 | 390 |
| 27 | [DO$_3$TAC]CrCl$_3$ | 23.2 | 30.9 | — | 18.6:1 | 1:1.44 | — | 40 | 324 |
| 28 | [DO$_3$TAC]CrCl$_3$ | 15.5 | 20.6 | — | 60:1 | — | — | 40 | 85 |
| 29 | [Cy$_3$TAC]CrCl$_3$ | 11.9 | 15.2 | 5.3 | 348:1 | — | — | 40 | 5.3 |
| 30 | [Me$_3$TAC]CrCl$_3$ | 4.8 | 16.7 | 7.9 | 473:1 | — | — | 40 | 455 |
| 31 | [Me$_3$TAC]CrCl$_3$ | 5.2 | 18.1 | — | 50:1 | 1:1.68 | — | 40 | 590 |
| 32 | [Cy$_3$TAC]VCl$_3$ | 8.3 | 16.9 | 10.6 | 627:1 | — | — | 40 | 5.3 |
| 33 | ([iPr—TAC]$_2$Xy]CrCl$_3$ | 11.6 | 15.2 | 5.3 | 348:1 | — | — | 40 | 6.6 |
| 34 | [PhEt$_3$TAC]CrCl$_3$ | 8.7 | 15.6 | 5.49 | 352:1 | — | — | 40 | 135 |
| 35 | [Bz$_3$TAC]CrCl$_3$ | 9.2 | 17.8 | 6.3 | 354:1 | — | — | 40 | 15.2 |
| 36 | [Bz$_3$TAC]CrCl$_3$ | 11.2 | 21.7 | — | 28:1 | 1:1.44 | — | 40 | 5.5 |
| 37 | [Do$_3$TAC]CrCl$_3$ | 12.5 | 16.7 | 5.85 | 350:1 | — | (C4)[2] | 40 | 215 |
| 38 | [PhEt$_3$TAC]CrCl$_3$ | 10.3 | 18.4 | 5.54 | 300:1 | — | (C6)[2] 30 | 40 | 180 |

| Ex. | Yield [g] | [min] | Density [g/cm$^3$] | Eta [dl/g] | $M_w$ [g/mol] | $M_n$ [g/mol] | Q — | C6[3] [%] | m.p. [° C.] | CH$_3$/1000 [/1000 C] |
|---|---|---|---|---|---|---|---|---|---|---|
| 18 | 7.9 | 60 | — | 2.62 | 133258 | 12047 | 11.06 | — | 135.9 | <1 |
| 19 | 52.7 | 60 | 0.9565 | 6.97 | 812171 | 19081 | 42.56 | — | 144.5 | 1.3 |
| 20 | 8.2 | 60 | — | 1.38 | 131969 | 15165 | 8.70 | — | 134.7 | 1.7 |
| 21 | 7.4 | 60 | 0.9610 | 1.05 | 28676 | 7641 | 3.75 | — | 130.7 | 2.0 |
| 22 | 0.124 | 60 | — | 4.36 | — | — | — | — | — | — |
| 23 | 1.20 | 60 | 0.9661 | 0.17 | 2599 | 1459 | 1.78 | — | 122.8 | 11.8 |
| 24 | 0.05 | 60 | — | 3.5 | — | — | — | — | — | — |
| 25 | 11.9 | 60 | 0.9570 | 1.04 | 27967 | 9804 | 2.085 | — | 128.9 | 2.6 |
| 26 | 7.9 | 60 | 0.9458 | 3.83 | — | — | — | 1.7 | 125.1 | 8.7 |
| 27 | 10 | 60 | 0.9621 | 0.65 | 23078 | 7317 | 3.15 | — | 128.8 | 3.0 |
| 28 | 1.75 | 60 | 0.9492 | 14.69 | — | — | — | — | 139.7 | <1 |
| 29 | 0.08 | 60 | — | 17.2 | — | — | — | — | — | — |
| 30 | 7.6 | 60 | 0.09595 | 1.68 | 37004 | 12008 | 3.08 | — | 132.6 | 1.7 |
| 31 | 7.1 | 60 | 0.9631 | 2.66 | 208752 | 4834 | 43.2 | — | 135.2 | 1.3 |
| 32 | 0.09 | 60 | — | 6.22 | — | — | — | — | — | — |
| 33 | 0.1 | 60 | — | 8.12 | — | — | — | — | — | — |
| 34 | 2.1 | 60 | 0.9661 | 0.59 | 19879 | 6613 | 3.01 | — | 129.7 | 2.9 |
| 35 | 0.27 | 60 | — | 24.0 | — | — | — | — | — | — |
| 36 | 0.12 | 60 | — | 25.3 | — | — | — | — | — | — |
| 37 | 3.6 | 60 | 0.9504 | 3.87 | | | | — | 137 | 3.2 |
| 38 | 3.3 | 60 | 0.9469 | 1.69 | 124363 | 13989 | 8.89 | 1.3 | 126.1 | 3.5 |

[1]Activation is carried out by addition of N,N-dimethylanilinium tetra(pentafluorophenyl)borate
[2]C$_6$ = 1-Hexene
C$_4$ = 1-Butene
[3]C$_6$ = 1-Hexene incorporated in the polymer

EXAMPLES 39 to 45

The polymerizations were carried out in a 1 l four-necked flask provided with contact thermometer, stirrer with Teflon blade, heating mantle and gas inlet tube. Under argon, from 10 to 20µm of (DO$_3$TAC)CrCl$_3$ in 250 ml of absolute toluene were in each case placed in the flask at 40° C. The amount of dimethylanilinium tetrakis(pentafluorophenyl)borate indicated in Table 3 was then added, the mixture was heated to 70° C. and subsequently admixed with Tibal (triisobutylaluminum) in a Cr:Al ratio of 1:50. The solution was cooled again to 40° C. and about 20–40 l/h of ethylene were subsequently passed through it for from 20 to 60 minutes.

The reaction was stopped by addition of a mixture of 15 ml of concentrated hydrochloric acid and 50 ml of methanol and the mixture was stirred for another 15 minutes. 250 ml of methanol were then added, the mixture was stirred for another 15 minutes, the solid was filtered off, washed with methanol and dried at 70° C. The polymerization and product data are summarized in Table 3.

increased to a final pressure of 40 bar by means of ethylene and the polymerization was continued for one hour.

The reaction was stopped by venting the reactor and the products were discharged. Table 4 summarizes the polymerization and product data.

TABLE 3

| Ex. | Complex [μmol] | Cr:B* | Yield [g] ([min]) | Activity [kgPE/molCr · h] | Eta [dl/g] | $CH_3$/1000 C | Density [g/cm$^3$] | m.p. [° C.] |
|---|---|---|---|---|---|---|---|---|
| 39 | 18.6 | 1:1.6 | 6.3 (60) | 338 | 0.97 | 2.3 | 0.9631 | — |
| 40 | 20.4 | 1:3.7 | 9.7 (60) | 475 | 4.45 | 1.9 | 0.9535 | — |
| 41 | 19.2 | 1:5.2 | 7.9 (60) | 411 | 2.63 | 2 | 0.9566 | — |
| 42 | 20.4 | 1:9.8 | 18 (30) | 1765 | 17.14 | <1 | 0.9313 | 140.2 |
| 43 | 19.05 | 1:9.8 | 13.6 (30) | 1428 | 12.49 | 1 | 0.9448 | 137.4 |
| 44 | 18.8 | 1:15 | 15.6 (20) | 2502 | 19.21 | <1 | 0.9317 | 142.8 |
| 45 | 10.13 | 1:10.2 | 16.5 (35) | 2790 | 20.78 | <1 | 0.9308 | 140.1 |

*Activation was carried out by addition of N,N-dimethylanilinum tetrapentafluorophenyl)borate

TABLE 4

| Ex. | Amount of catalyst [mg] | Yield [g] | t(poly)[1] [min] | Activity [kg/molCr · h] | $C_4^{[2]}$ [ml] | $H_2$ [bar] | Density [g/cm$^3$] | Eta [dl/g] | HLMI [g/10 min] |
|---|---|---|---|---|---|---|---|---|---|
| 47 | 1200 | 300 | 70 | 250 | — | — | 0.9546 | 1.00 | 209.8 |
| 48 | 650 | 350 | 40 | 540 | — | — | 0.9568 | 0.93 | 325 |
| 49 | 902 | 700 | 30 | 800 | 400 | 5 | 0.9640 | 0.31 | |
| 50 | 410 | 400 | 90 | 1000 | 400 | 5 | 0.9643 | 0.35 | |
| 51 | 598 | 950 | 90 | 1600 | 400 | — | 0.9547 | 2.67 | |

[1]t(poly): Polymerization time
[2]$C_4$: 1-Butene

EXAMPLE 46
Application to a Polystyrene Support

Polystyrene (102 g) was suspended in 700 ml of toluene and stirred at room temperature for 5 hours. The polystyrene was then filtered off and stirred with 800 ml of diethyl ether for 1 day. The polystyrene was filtered off again and subsequently suspended in 800 ml of methanol. After the mixture had been filtered again, the solid was once again suspended in 800 ml of methanol and filtered again. The resulting polystyrene was dried under reduced pressure. In this way, purified polystyrene could generally be obtained in a yield of about 90% by weight.

11.5 g of polystyrene support material were added to a mixture of 863 mg of (DO$_3$TAC)CrCl$_3$, 50.1 ml of methylaluminoxane (30% by weight in toluene) (Al:Cr=200:1) and 5 ml of toluene and the mixture was stirred at room temperature for 3 hours. Drying under reduced pressure gave 27.4 g of supported catalyst having a loading of 100 μmol/g of support.

EXAMPLES 47 to 51

The polymerizations were carried out in a 10 l stirring autoclave. Under nitrogen, 100 mg of Tibal (triisobutylaluminum) were placed in the autoclave at room temperature, and 4 l of isobutane were then metered in. For copolymerization of butene, 400 ml of butene were additionally condensed into the autoclave. The mixture was then heated to 70° C. while stirring and the amount of supported catalyst indicated in Table 4 was subsequently injected by means of ethylene pressure. The reactor pressure was then increased to a final pressure of 40 bar by means of ethylene and the polymerization was continued for one hour.

EXAMPLE 52
Application to a Silica Gel Support

The silica gel used was ES70X from Crossfield [sic].

EXAMPLE 52

32.3 ml of MAO (1.55 M in toluene) (50 mmol) were added to 375 mg of (DO$_3$TAC)CrCl$_3$ (0.5 mmol) dissolved in 21.76 ml of toluene and the mixture was stirred at room temperature for 15 minutes. 5 g of silica gel (calcined at 600° C.) were then added to the reaction mixture and the resulting suspension was stirred at room temperature for 6 hours. It was then allowed to stand overnight, the solid was subsequently filtered off and then washed twice with heptane. The solid isolated in this way was dried under reduced pressure. Yield: 8.2 g of supported catalyst.

EXAMPLES 53 and 54

The polymerizations were carried out in a 10 l stirring autoclave. Under nitrogen, Tibal (triisobutylaluminum) was introduced into the autoclave at room temperature, after which 4 l of isobutane were condensed in and, if appropriate, 100 ml of hexene were added. The mixture was then heated to 70° C. while stirring and the amount indicated in Table 4 [sic] of the supported catalyst from Example 52 was subsequently injected by means of ethylene pressure. The reactor pressure was then increased to a final pressure of 40 bar by means of ethylene and the polymerization was continued for 90 minutes.

The reaction was stopped by venting the reactor and the products were discharged. Table 5 summarizes the polymerization and product data.

EXAMPLE 55

808 mg of dimethylanilinium tetrakis(pentafluorophenyl) borate (1 mmol) were added to 375 mg of $(DO_3TAC)CrCl_3$ (0.5 mmol) dissolved in 300 ml of toluene and the mixture was heated to 75° C. After cooling to room temperature, 5 g of silica gel (calcined at 600° C.) were added to the reaction mixture. The suspension was then stirred at room temperature for one hour and the solvent was subsequently removed under reduced pressure.

Yield: 6.5 g of supported catalyst (5% of residual toluene).

The polymerizations were carried out in a 1 l stirring autoclave. Under nitrogen, the amount of TEAL (triethylaluminum) indicated in Table 5 was introduced into the autoclave at room temperature, after which 400 ml of isobutane were metered in. The mixture was then heated to 70° C. while stirring and the amount indicated in Table 5 of the supported catalyst from Example 55 was then injected by means of ethylene pressure. The reactor pressure was then increased to a final pressure of 40 bar by means of ethylene and the polymerization was continued for one hour.

The reaction was stopped by venting the reactor and the products were discharged. Table 5 summarizes the polymerization and product data.

EXAMPLE 56

1454 mg of dimethylanilinium tetrakis(pentafluorophenyl)borate (1.8 mmol) were added to 675 mg of $(DO_3TAC)CrCl_3$ (0.9 mmol) dissolved in 50 ml of toluene and the mixture was heated to 80° C. After cooling to 50° C., 6 g of silica gel (calcined at 600° C.) were added to the reaction mixture. The suspension was then stirred at 80° C. for 30 minutes and the solvent was subsequently removed under reduced pressure. Yield: 7.6 g of supported catalyst.

The polymerization was carried out as in Example 55 using the supported catalyst from Example 56. Polymerization conditions and product data are shown in Table 5.

EXAMPLE 57

485 mg of dimethylanilinium tetrakis(pentafluorophenyl) borate (0.6 mmol) were added to 225 mg of $(DO_3TAC)CrCl_3$ (0.3 mmol) dissolved in 50 ml of toluene and the mixture was heated to 75° C. After cooling to room temperature, 6 g of silica gel (calcined at 600° C.) were added to the reaction mixture. The suspension was then stirred at room temperature for one hour, then allowed to stand for 2 hours and the solvent was subsequently removed under reduced pressure. Yield: 6.8 g of supported catalyst.

The polymerization was carried out as in Example 55 using the supported catalyst from Example 57. Polymerization conditions and product data are shown in Table 5.

EXAMPLE 58

970 mg of dimethylanilinium tetrakis(pentafluorophenyl) borate (1.2 mmol) were added to 450 mg of $(DO_3TAC)CrCl_3$ (0.6 mmol) dissolved in 50 ml of toluene and the mixture was heated to 75° C. After cooling to room temperature, 6 g of silica gel (which had been heated at 130° C. under reduced pressure for 6 h) were added to the reaction mixture. The suspension was then stirred at room temperature for an hour, then allowed to stand for 2 hours and the solvent was subsequently removed under reduced pressure.

Yield: 7.2 g of supported catalyst.

The polymerization was carried out as in Example 55 using the supported catalyst from Example 58. Polymerization conditions and product data are shown in Table 5.

EXAMPLE 59

970 mg of dimethylanilinium tetrakis(pentafluorophenyl) borate (1.2 mmol) were added to 450.2 mg of $(DO_3TAC)CrCl_3$ (0.6 mmol) dissolved in 100 ml of toluene and the mixture was heated to 80° C. After cooling to room temperature, first 15 ml of Tibal (2M in toluene) (15 mmol) and subsequently 6 g of silica gel (calcined at 600% C) were added to the reaction mixture. The suspension was then stirred at room temperature for 1 hour and the solvent was subsequently removed under reduced pressure. Yield: 12.6 g of supported catalyst.

The polymerization was carried out as in Example 55 using the supported catalyst from Example 59. Polymerization conditions and product data are shown in Table 5.

TABLE 5

| Ex. | Amount of catalyst [mg] | TEAl[1] [mg] | Yield [g] | t(poly)[2] [min] | Productivity [gPE/gCat] | $C_6$[3] [ml] | $T_p$ [° C.] | Density [g/cm$^3$] | Eta [dl/g] | % $C_6$[4] [%] |
|---|---|---|---|---|---|---|---|---|---|---|
| 53 | 721 | 150 | 600 | 90 | 830 | — | 70 | 0.9554 | 5.08 | |
| 54 | 1100 | 150 | 750 | 90 | 700 | 100 | 70 | 0.9547 | 3.47 | 1 |
| 55 | 94 | 50 | 128 | 60 | 1360 | — | 40–70 | 0.9453 | | |
| 56 | 132 | 50 | 90 | 60 | 680 | — | 70 | 0.9406 | | |
| 57 | 107 | 50 | 31 | 60 | 290 | — | 70 | 0.9466 | | |
| 58 | 101 | 50 | 47 | 60 | 465 | — | 70 | | | |
| 59 | 141 | 20 | 51 | 60 | 360 | — | 70 | | | |

[1]TEAL: Triethylaluminum
[2]t(poly): Polymerization time
[3]$C_6$: 1-Hexene
[4]% $C_6$: % by weight of $C_6$ in the polymer

We claim:
1. A process for copolymerizing ethylene or propylene with one another or with other olefinically unsaturated compounds, which comprises carrying out in the polymerization in the presence of a catalyst system which comprises the following components:
   A) a complex of a transition metal with one or two substituted or unsubstituted 1,3,5-triazacyclohexane ligands, and

B) one or more aluminoxane activator compounds, wherein the component (A) is a compound of the formula I

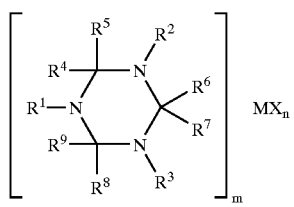

in which:

M is a transition metal of groups 4 to 12 of the Periodic Table, $R^1$–$R^9$ are hydrogen or organosilicon or organic substituents having from 1 to 30 C atoms, it being possible for two geminal or vicinal radicals $R^1$ to $R^9$ radicals also be connected to form a 5- or 6-membered ring, and it being possible, when m is 2, for an $R^1$–$R^9$ radical of in each case one triazacyclohexane ring to form together with a substituents on the other triazacyclohexane ring a bridge between the two rings, X is fluorine, chlorine, bromine, iodine, hydrogen, $C_1$–$C_{10}$-alkyl, $C_6$–$C_{15}$-aryl or alkylaryl having from 1 to 10 C atoms in the alkyl radical and from 6 to 20 C atoms in the aryl radical, trifluoroacetate, $BF_4$—, $PF_6$— or bulky noncoordinating anions, m is 1 or 2, n is a number from 1 to 4 which corresponds to the oxidation state of the transition metal M.

2. A process as claimed in claim 1, wherein M is a transition metal of group 6 of the Periodic Table.

3. A process as claimed in claim 1, wherein mixtures of ethylene with $C_3$–$C_8$-α-olefins are employed as monomers.

4. A process as claimed in claim 1, wherein at least one of the radicals $R^1$, $R^2$ or $R^3$ is different from the other radicals in this group.

5. A catalyst for polymerizing olefins, comprising at least one transition metal complex (A) as defined in claim 1 and a support material and, one or more aluminoxane activator compounds (B).

6. A process for polymerizing or copolymerizing olefins wherein the polymerization or copolymerization is carried out in the presence of a catalyst as claimed in claim 5.

7. A process as claimed in claim 1, wherein m is 2 and one radical $R^1$–$R^1$ of one triazacyclohexane ring together with one of these substituents of the other triazacyclohexane ring forms a bridge between the two rings.

8. A process as claimed in claim 1, wherein the transition metal is titanium, zirconium, hafnium, vanadium, chromium, molybdenum, tungsten, manganese, iron, rhodium or nickel.

9. A process for copolymerizing ethylene or propylene with one another or with other olefinically unsaturated compounds at 20 to 300° C. under pressures from 5 to 4000 bar, which comprises the following steps:

a) contacting a complex of a transition metal with one or two substituted or unsubstituted 1,3,5-triazacyclohexane ligands (A) with at least one aluminoxane activator compound (B), b) contacting the reaction product from step (a) with the olefinically unsaturated compounds under polymerization conditions wherein the component (A) is a compound of the formula I

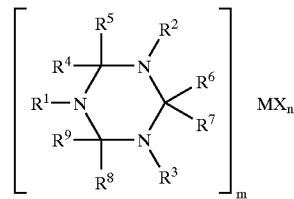

in which:

M is a transition metal of groups 4 to 12 of the Periodic Table, $R^1$–$R^9$ are hydrogen or organosilicon or organic substituents having from 1 to 30 C atoms, it being possible for two geminal or vicinal radicals $R^1$ to $R^9$ radicals also be connected to form a 5- or 6-membered ring, and it being possible, when m is 2, for an $R^1$–$R^9$ radical of in each case one triazacyclohexane ring to form together with a substituents on the other triazacyclohexane ring a bridge between the two rings, X is fluorine, chlorine, bromine, iodine, hydrogen, $C_1$–$C_{10}$-alkyl, $C_6$–$C_{15}$-aryl or alkylaryl having from 1 to 10 C atoms in the alkyl radical and from 6 to 20 C atoms in the aryl radical, trifluoroacetate, $BF_4$—, $PF_6$— or bulky noncoordinating anions, m is 1 or 2, n is a number from 1 to 4 which corresponds to the oxidation state of the transition metal M.

10. A transition metal complex of the formula I

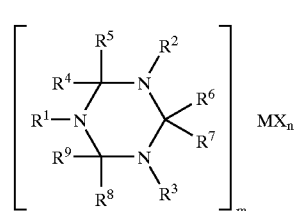

in which:

M is a transition metal of groups 4 to 12 of the Periodic Table, $R^1$–$R^9$ are hydrogen or organosilicon or organic substituents having from 1 to 30 C atoms, it being possible for two geminal or vicinal radicals $R^1$ to $R^9$ radicals also be connected to form a 5- or 6-membered ring, and it being possible, when m is 2, for an $R^1$–$R^9$ radical of in each case one triazacyclohexane ring to form together with a substituents on the other triazacyclohexane ring a bridge between the two rings, X is fluorine, chlorine, bromine, iodine, hydrogen, $C_1$–$C_{10}$-alkyl, $C_{6-15}$-aryl or alkylaryl having from 1 to 10 C atoms in the alkyl radical and from 6 to 20 C atoms in the aryl radical, trifluoroacetate, $BF_4$—, $PF_6$— or bulky noncoordinating anions, m is 1 or 2, n is a number from 1 to 4 which corresponds to the oxidation state of the transition metal M, wherein at least one of the radicals $R^1$, $R^2$ or $R^3$ is different from the other radicals in this group.

11. A transition metal complex of the formula I as defined in claim 10, wherein m is 2 and one radical $R^1$–$R^9$ of one triazacyclohexane ring together with one of these substituents of the other triazacyclohexane ring forms a bridge between the two rings.

12. A process as claimed in claim 10, wherein the transition metal is selected from group 6 of the Periodic Table.

* * * * *

UNITED STATES PATENT AND TRADEMARK OFFICE
CERTIFICATE OF CORRECTION

PATENT NO. : 6,887,958 B1  Page 1 of 1
APPLICATION NO. : 09/937780
DATED : May 28, 2000
INVENTOR(S) : Mihan et al.

It is certified that error appears in the above-identified patent and that said Letters Patent is hereby corrected as shown below:

On the Title page, item [22] the PCT filing date should read, --March 28, 2000--

On the Title page item [30] The claim to priority of US application Serial No. 09/277,823, filing date --March 29, 1999-- should be enter Claim 12: column 26, indicated lines 4 – 5, should depend upon claim 1 rather than claim 10.

Signed and Sealed this

Tenth Day of April, 2007

JON W. DUDAS
*Director of the United States Patent and Trademark Office*

UNITED STATES PATENT AND TRADEMARK OFFICE
CERTIFICATE OF CORRECTION

PATENT NO. : 6,887,958 B1
APPLICATION NO. : 09/937780
DATED : May 3, 2005
INVENTOR(S) : Mihan et al.

It is certified that error appears in the above-identified patent and that said Letters Patent is hereby corrected as shown below:

On the Title page, item [22] the PCT filing date should read, --March 28, 2000--

On the Title page item [30] The claim to priority of US application Serial No. 09/277,823, filing date --March 29, 1999-- should be enter Claim 12: column 26, indicated lines 4 – 5, should depend upon claim 1 rather than claim 10.

This certificate supersedes Certificate of Correction issued April 10, 2007.

Signed and Sealed this

Eighth Day of May, 2007

JON W. DUDAS
*Director of the United States Patent and Trademark Office*